United States Patent [19]
Schneider

[11] Patent Number: 5,025,627
[45] Date of Patent: Jun. 25, 1991

[54] REMOTE CONTROLLED HIGH FORCE ACTUATOR

[76] Inventor: Edward T. Schneider, 8729 Hilltop, Mentor, Ohio 44060

[21] Appl. No.: 402,616

[22] Filed: Sep. 5, 1989

[51] Int. Cl.[5] .............................................. F02G 7/06
[52] U.S. Cl. ....................................... 60/527; 60/528; 60/530
[58] Field of Search .................. 60/527, 528, 529, 530, 60/531

[56] References Cited

U.S. PATENT DOCUMENTS

| | | | |
|---|---|---|---|
| 2,215,157 | 9/1940 | Platzner | 60/527 |
| 2,989,281 | 6/1961 | Fritts | 60/531 X |
| 3,194,010 | 7/1965 | Lejon . | |
| 3,937,019 | 2/1976 | Renner | 60/527 |
| 4,041,706 | 8/1977 | White | 60/527 |
| 4,055,954 | 11/1977 | Marks et al. | 60/527 |
| 4,075,845 | 2/1978 | Allen | 60/527 |
| 4,081,963 | 4/1978 | Stove | 60/528 |
| 4,220,006 | 9/1980 | Kindt | 60/527 |
| 4,385,494 | 5/1983 | Golben | 60/528 |
| 4,414,814 | 11/1983 | White | 60/682 |
| 4,442,670 | 4/1984 | Goldman | 60/517 |
| 4,553,393 | 11/1985 | Ruoff | 60/527 X |

Primary Examiner—Allen M. Ostrager
Attorney, Agent, or Firm—Fay, Sharpe, Beall, Fagan, Minnich & McKee

[57] ABSTRACT

A piston (14) is slidably received in a chamber (10). The chamber is filled with an expandable medium (16), such as wax, that expands and contracts significantly as it undergoes a phase change from a solid to a liquid state. A Peltier effect chip (20) selectively adds and removes heat energy from the chamber, hence the medium, to cause the medium to change phase. A temperature control (26) maintains the temperature of the medium substantially at the phase change temperature such that the addition of heat causes an isothermal melting (hence, expansion) and the removal of heat causes an isothermal solidification (hence, contraction). The chamber defines a plurality of thin branches (42) such that the heat is transferred more effectively.

21 Claims, 4 Drawing Sheets

REMOTE CONTROLLED HIGH FORCE ACTUATOR

BACKGROUND OF THE INVENTION

The present invention relates to the actuator art. The invention finds particular application in conjunction with electrically controlled extensible piston actuators and will be described with particular reference thereto. However, it is to be appreciated that the invention will also find application in conjunction with other non-electrical control systems, other types of movable actuators, and the like.

Solenoids are the most common electrically controlled extensible actuators. Electrical current is selectively applied to an outer coil. Magnetic interaction with a moveable ferromagnetic core causes the core or a connected piston to be extended or retracted. Although the simplicity of electrical control renders solenoids convenient to use, solenoids produce relatively little force for their physical size.

When high force is required, hydraulic or pneumatic cylinders are commonly employed. Although the cylinders provide much more force for their physical size, the control lines, pumps, fluid reservoirs, pressure regulators, and other associated support devices render fluid cylinders complex to use.

The present invention provides a new and improved actuator which overcomes the above referenced problems and others.

SUMMARY OF THE INVENTION

In accordance with one aspect of the present invention, a chamber that slidably receives a piston is filled with an expansible medium that expands and contracts with heating and cooling to extend and retract the piston. A controllable heating and cooling means is interconnected with the chamber in order to heat and cool the expansible medium.

More specifically to the preferred embodiment, the expansible medium expands and contracts most significantly as it undergoes a phase change between a liquid and solid state. A temperature control means controls the heating/cooling means to hold the medium substantially at its melting point. Additional heat input is isothermally absorbed to melt and expand the medium and heat energy is isothermally removed to solidify and contract the medium.

In accordance with a still more limited aspect of the present invention, the temperature control means monitors movement or position of the piston rather than temperature making a direct measurement. It controls the heating/cooling means in accordance with piston position to maintain it substantially at its melting point.

In accordance with another more limited aspect of the present invention, the chamber includes a plurality of thin paths to increase surface area of the expansible medium and improve the efficiency of heat transfer into and out of the medium.

In accordance with another more limited aspect of the present invention, the heating and cooling is achieved with Peltier effect thermoelectric heating/cooling chips and the expansible medium is a wax.

In accordance with another aspect of the present invention, a method of extending and retracting a cylinder is provided. An expansible medium that expands on melting is contained in a chamber and held substantially at its melting temperature. Additional heat is added to the media causing to undergo a phase transformation to an expanded liquid state, which expansion extends a piston. The expansible medium continues to be held substantially at the melting point temperature to hold it in its expanded liquid state while the piston is extended. To retract the piston, heat is extracted from the medium.

One advantage of the present invention is that it provides the actuating force of a hydraulic cylinder with the controlled simplicity of a solenoid.

Another advantage of the present invention is that the actuator is much smaller and lighter in weight than prior art actuators which produce an equivalent force.

Still further advantages of the present invention will become apparent to those of ordinary skill in the art upon reading and understanding the following detailed description.

BRIEF DESCRIPTION OF THE DRAWINGS

The invention may take part in various components and arrangements of components and in various steps and arrangements of steps. The drawings are only for purposes of illustrating the preferred embodiment and are not to be construed as limiting the invention.

DETAILED DESCRIPTION OF THE PREFERRED EMBODIMENTS

Figure 1:
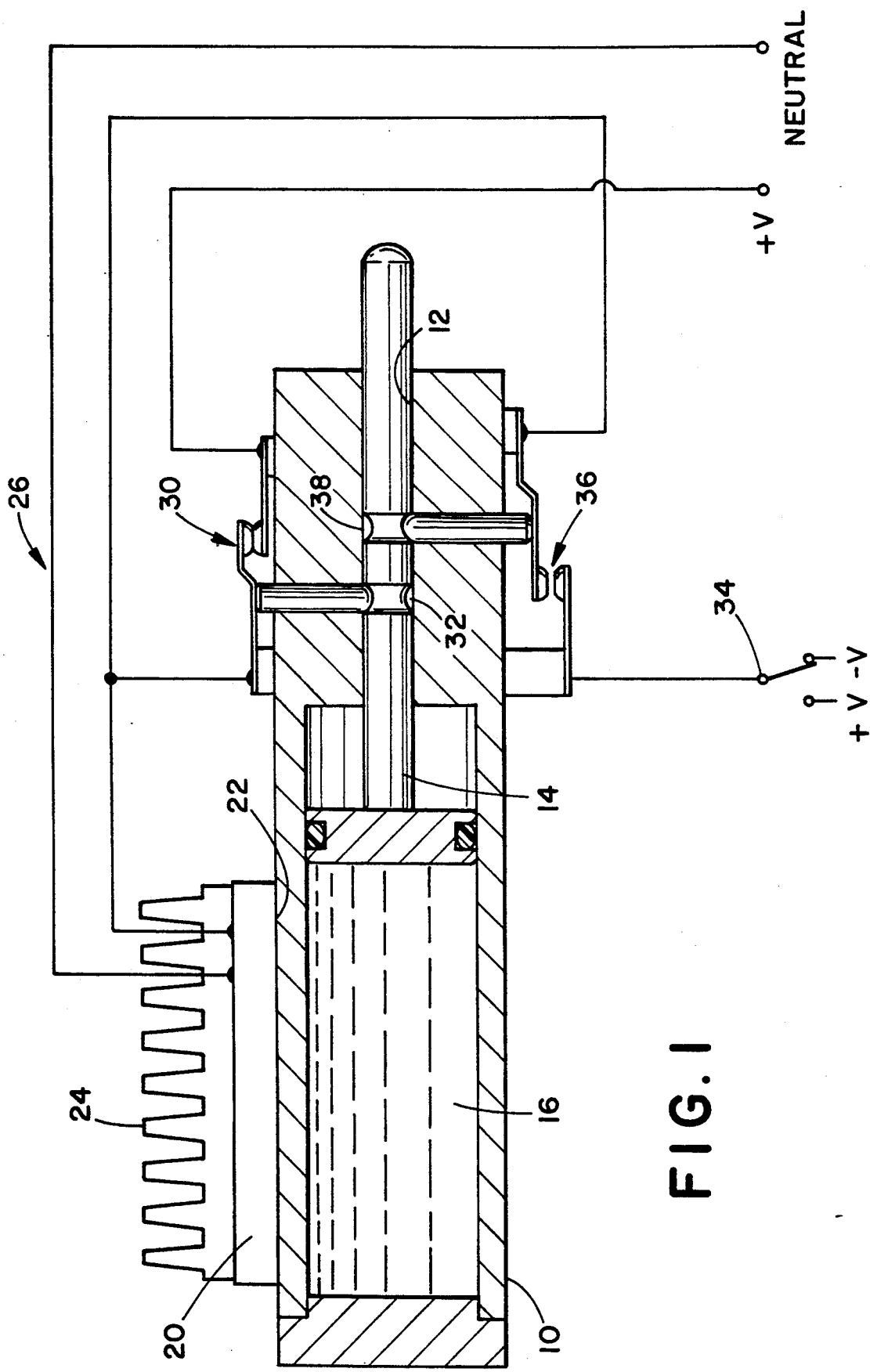
FIG. 1 is a diagrammatic illustration of an actuator in accordance with the present invention.

A chamber 10 has a passage 12 through which a piston or extensible member 14 is slidably received. An expandable medium 16, such as a wax, fills the chamber.

The wax expands significantly as it changes phase from solid to liquid. Wax, for example, commonly increases 12-15% as it changes phase isothermally from its solid to liquid state.

A temperature changing means 20, preferably a Peltier effect thermoelectric heating/cooling chip, selectively adds and removes heat from the expandable medium in the chamber. When connected with a source of electricity of one polarity, the Peltier effect chip heats its surface 22 closest to the chamber to transmit heat energy into the wax. When connected with the opposite polarity, the Peltier chip draws heat from its face against the chamber and discharges the heat through cooling fins 24 on an opposite face. A temperature control means 26 controls the Peltier chip to hold the expandable medium substantially at its melting temperature.

When thermal energy is applied to room temperature wax, the wax retains its solid form but increases in temperature until it reaches its melting point, e.g. 125° F. The additional energy necessary to change from the solid to liquid phase is supplied by the application of additional thermal energy. However, the absorbed thermal energy causes an isothermal phase change rather than increasing the temperature of the wax until the phase change is completed. If additional thermal energy is applied after the phase change, the liquid wax would increase in temperature. When thermal energy is removed, the liquid wax isothermally solidifies. In this manner, the wax expands and contracts about 12–15% as heat is added to or removed from the wax which is held at its melting point temperature.

The temperature control means 26 includes no direct thermal element in the preferred embodiment. Rather, it controls the temperature of the expandable medium by monitoring the volume. The expandable medium is heated to and held at the melting point temperature. A small additional amount of heat is added to a small fraction of the expansion, e.g. to change a small percentage of the expandable medium to its liquid state. This marks the equilibrium retracted position. A first cam operated switch 30 that is received in a first recess 32 in the piston closes each time the piston starts to retract and opens whenever the piston starts to extend. When the switch closes, indicating that the small percentage of the liquid phase is starting to solidify, the first switch 30 closes conducting electrical current to the heating means to add additional heat energy into the expandable medium. When the retracted equilibrium position is again attained, the cam operated switch 30 opens and the application of heat is terminated.

To expand or retract the piston, voltage of an appropriate polarity is applied to a control lead 34. To expand the piston, a first polarity voltage is applied to the lead and conveyed through a second cam operated switch 34–36 to the Peltier chip. Voltage of the first polarity causes the Peltier chip to pump heat into the expandable medium effecting the phase change, expansion of the medium, and extension of the piston 14. When the piston has been extended its full range, the second cam operated switch engages the first recess 32 and opens to terminate the supply of power to the Peltier chip. In the extended position, the second cam switch 36 engages the first recess 32 and opens. The second switch 36 closes each time the piston starts to retract, supplying more heating polarity voltage and opens when it returns to the full extended position.

To retract the piston, the opposite polarity potential is applied to the control lead 34. The opposite polarity control voltage is conveyed through the second switch 36 to the Peltier chip 20 to operate it in a heat removal mode. The heat is removed until the cam of the second switch 36 falls into a second recess 32 in the piston, opening the second switch and stopping the application of second polarity potential. The first switch 30 interacts with the first recess 32 in the piston to maintain the piston in the retracted position.

Figure 2:
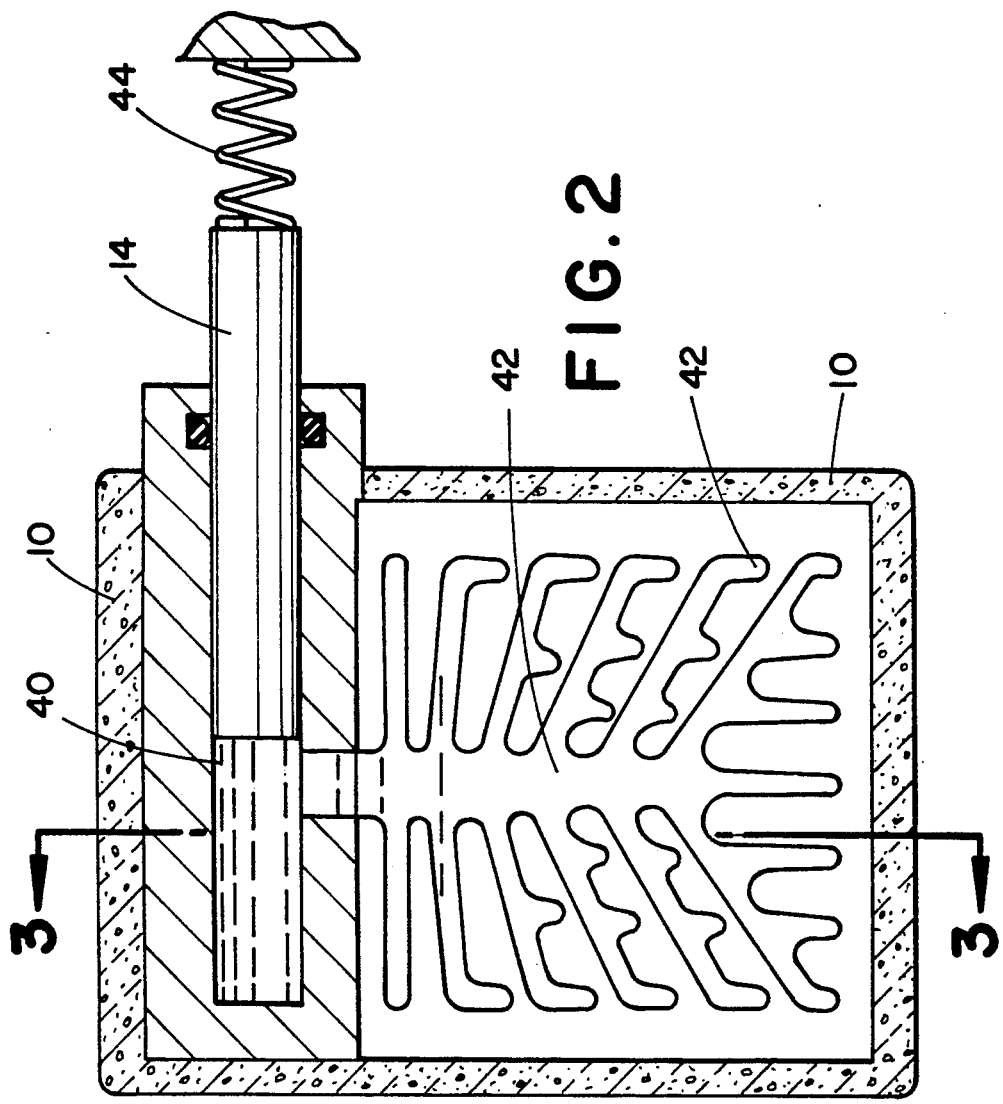
FIG. 2 is an alternate embodiment of the present invention with a quicker reaction time.

The speed with which the actuator extends and retracts is determined in substantial part by the rate at which heat is introduced into and removed from the heat expandable medium. The efficiency of the heat transfer is increased by increasing the surface area to volume ratio of the expandable medium, i.e. the chamber interior. In the embodiment of FIG. 2, the chamber includes a plurality of thin channels that are cut or etched into a highly heat conductive material, e.g. copper or aluminum, which defines the chamber. Preferably, each path is relatively thin in the direction of heat transfer. When the wax or other expandable material is relatively thin in the direction of heat transfer, the distance that the heat propagates through the wax is minimized. It might be noted that the heat conductivity of copper is about 280 times the conductivity of wax. The slow transfer of heat through the wax is a limiting factor on the rate at which the wax can change phase. Flat, sandwich designs, as illustrated in FIGS. 2 and 3, are particularly effective in this regard.

The chamber 10 is also constructed with sufficient strength to accommodate the pressures developed in the actuator. Pressures on the order of 30,000 psi can be attained. Accordingly, the chamber walls must have sufficient strength to withstand such pressures. Relatively thin slabs of copper, e.g. 0.020 inches, with relatively small internal chambers, e.g. 0.020 inches, cross tied for strength have been found to be effective. A flat exterior surface maximizes the contact area between the heat conductive chamber and a flat Peltier chip to improve the efficiency with which heat is moved. Other surface and Peltier chip shapes may be utilized as are appropriate.

Figure 3:
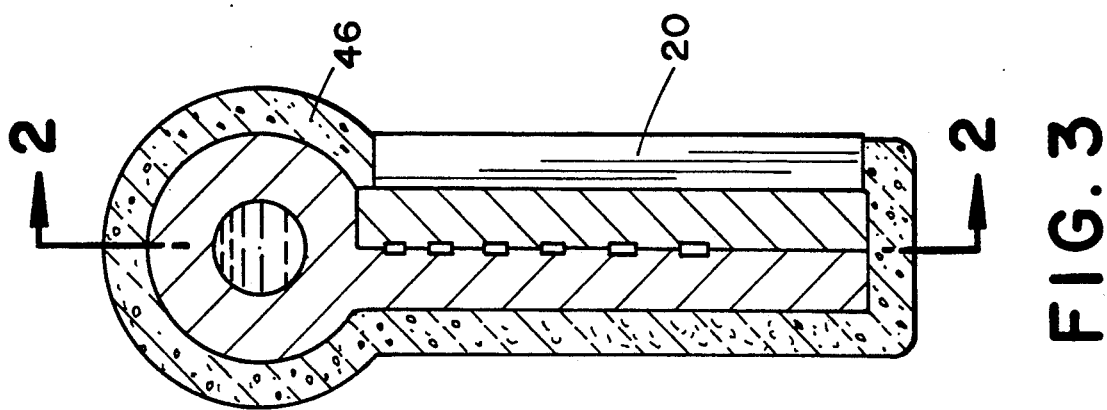
FIG. 3 is a sectional view through section 3—3 of FIG. 2.

In the embodiments of FIGS. 2 and 3, a central piston reservoir 40 is fed by a tree or river-like pattern of contributory paths 42. That is, relatively small paths merge into larger contributory paths which merge again into still larger paths, etc. Alternately, linear tapered paths may extend in parallel from the piston reservoir. This gradual expansion of paths flowing into the central piston reservoir is of particular importance during piston retraction. The thinner paths tend to cool first such that the wax cools or retracts from the inner most end first. If the wax were to start contracting at the center, it could conceivably form a plug such that the contraction of wax upstream only draws a vacuum rather than assisting in retracting the piston. Optionally, a return spring 44 may be provided for assuring that the piston retracts into the cylinder as the wax contracts rather than allowing a vacuum to be drawn.

As another option, thermal insulation 46 may cover exposed surfaces of the chamber to minimize incidental heat transfer. Limiting heat transfer to the heating and cooling means 20 improves controllability.

Figure 4:
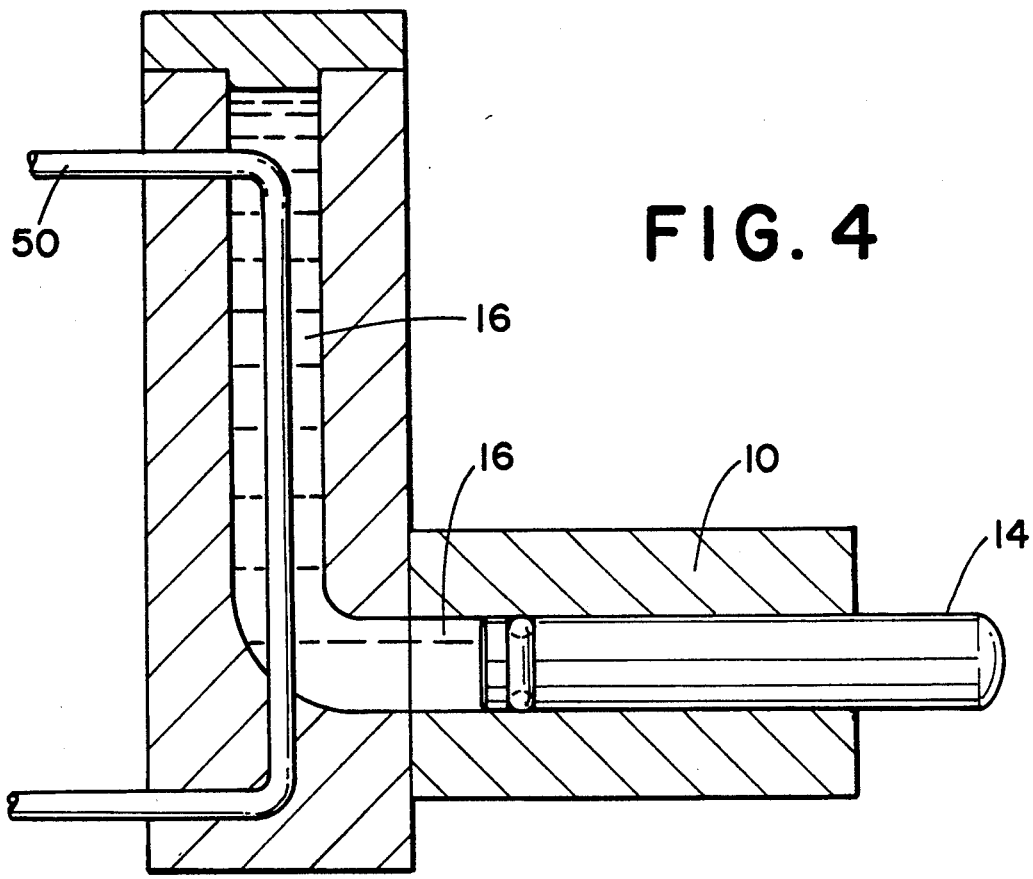
FIG. 4 is another alternate embodiment.

In the embodiment of FIG. 4, the heating/cooling means includes a tube 50 passing through the expandable medium 16 in the chamber 10. The chamber connects with the end of the piston. A thermal liquid is pumped through the tubing to heat the wax to effect a solid-to-liquid phase change or to cool the wax to effect a liquid-to-solid phase change.

Figure 5:
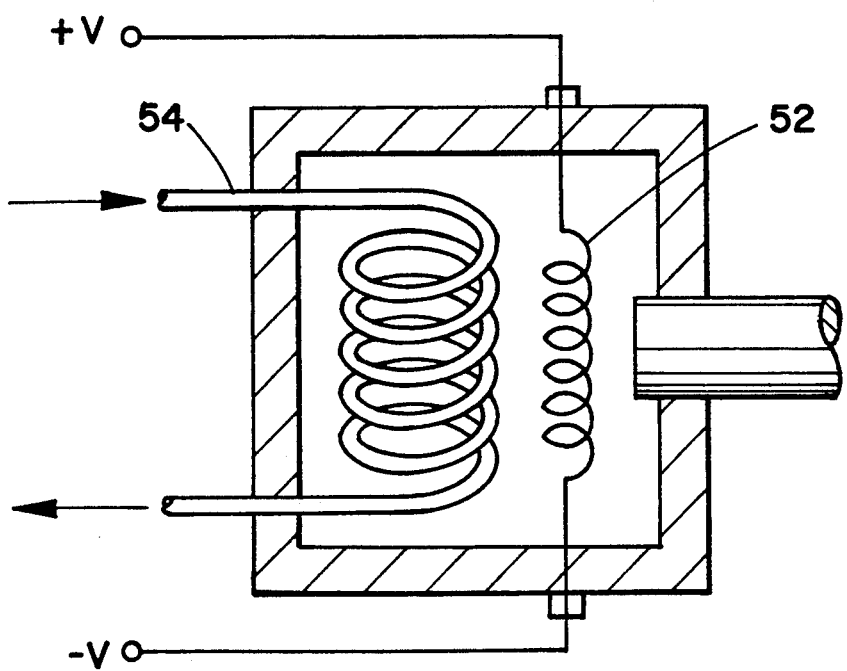
FIG. 5 is another alternate embodiment.

In the embodiment of FIG. 5, the heating/cooling means 20 includes a resistive heating element 52 passing through the chamber to heat the wax. A cooling coil 54 selectively pumps a cooling fluid through the wax to solidify it.

Figure 6:
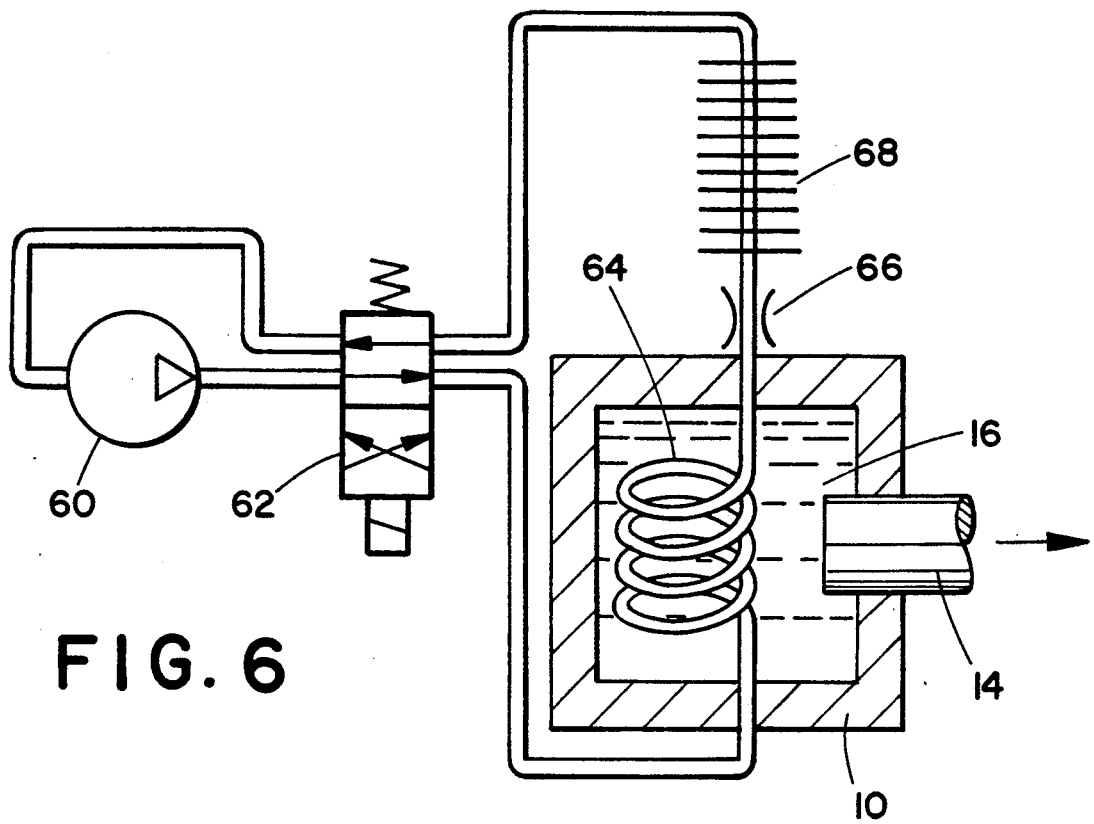
FIG. 6 is yet another alternate embodiment of the present invention.
Figure 7:
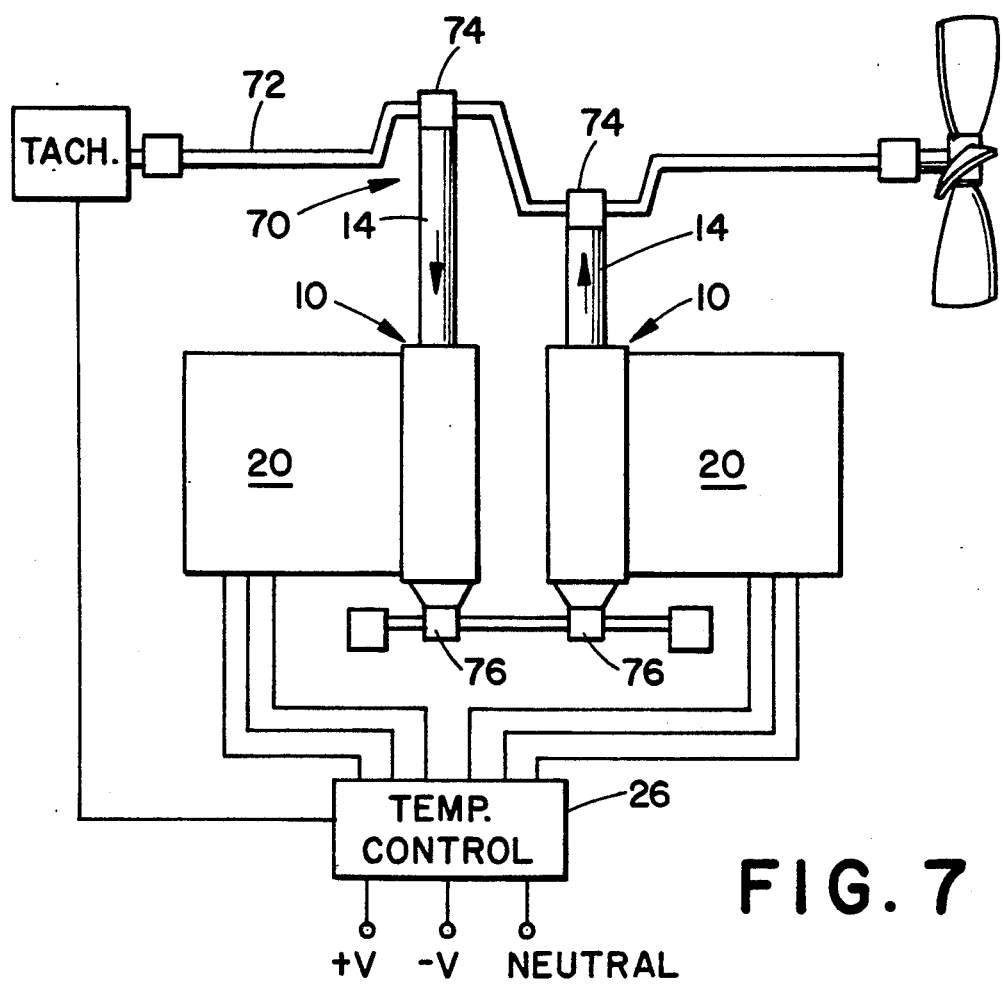
FIG. 7 illustrates an embodiment which provides a continuous rotary output.

In the embodiment of FIG. 6, the heating and cooling means 20 is a freon heat pump. A compressor 60 compresses freon from its gas phase to its liquid phase, which compression adds heat to the liquid freon. A heat/cool control valve 62 determines whether the heat pump heats or cools the wax. In the heating mode, the hot freon passes through a heat exchanger coil 64 in the wax in the reservoir. The liquid freon is converted into a gaseous freon state at a restrictor 66 and discharged into a heat exchanger 62. The gaseous freon is returned to the compressor and the cycle repeated. In the cooling mode, the compressor pumps the hot liquid freon to the heat exchanger 62 where it is cooled towards room temperature. The phase change at the restrictor 66 drops the temperature of the freon substantially as it passes into its gaseous phase. The heat exchanger coil 64 is cooled by the phase change withdrawing heat from the wax.

One or more of the piston and cylinder combinations may be connected with a means 70 for converting the reciprocating movement into rotary motion. In the illustrated embodiment, the reciprocating to rotating conversion means includes a crankshaft 72 that is driven by two identical piston/cylinder combinations. Each piston cylinder combination is rotatably connected by a bearing 74 with the crankshaft and pivotally connected with ground at the other end by a bearing 76. A tachometer 72 monitors rotation of the crankshaft to indicate the beginning of the piston extension and retraction cycle portions. The temperature control means 26 alternately supplies voltage of the first and second polarity to the Peltier chips 20, out of phase. Of course, the crankshaft may be driven by a single actuator or a large plurality of actuators.

The invention has been described with reference to the preferred embodiment. Obviously, modifications and alterations will occur to others upon reading and understanding the preceding specification. It is intended that the invention be construed as including all such alterations and modifications insofar as they come within the scope of the appended claims or the equivalents thereof.

Having thus described the preferred embodiments, the invention is now claimed to be:

1. A remotely controlled actuator comprising:
    a chamber filled with a medium that expands as it undergoes a phase change from a solid phase to a liquid phase and contracts as it changes phase from the liquid phase to the solid phase;
    a piston slidably received in the chamber for extending and retracting as the medium expands and contracts;
    a means for selectively heating and cooling the medium to cause the medium to change phase, extending and retracting the piston;
    a temperature control means for controlling the heating and cooling means to maintain the medium substantially at a melting point temperature at which the medium undergoes the phase change.

2. The actuator as set forth in claim 1 wherein the medium is a wax.

3. The actuator as set forth in claim 1 wherein the heating and cooling means includes a Peltier effect thermal heating/cooling device mounted to transfer heat into the chamber when actuated with a first polarity electrical potential and transfer out of the chamber when actuated with a second polarity electrical potential.

4. The actuator as set forth in claim 1 wherein the temperature control means includes a switch means which is opened and closed as the piston extends and retracts, the switch means being operated by the piston as it starts to contract below one of a preselected retracted position and a preselected extended position such that additional heat is introduced into the medium as necessary to maintain the piston at the selected one of the retracted and extended positions.

5. The actuator as set forth in claim 1 wherein the heating and cooling means includes coils for circulating hot and cold fluids to transfer heat to and from the expandable medium.

6. The actuator as set forth in claim 1 wherein the heating and cooling means includes an electrical resistance heating means for selectively heating the medium.

7. The actuator as set forth in claim 6 wherein the heating and cooling means further includes a coolant coil for selectively circulating cooling fluid through the medium.

8. The actuator as set forth in claim 6 wherein the heating and cooling means further includes cooling fins for selectively cooling the medium to ambient air.

9. The actuator as set forth in claim 1 wherein the heating and cooling means includes a liquid to vapor phase change refrigeration system for selectively heating and cooling the medium.

10. An electrically controlled actuator comprising:
    a chamber which contains a medium which expands and contracts as it undergoes a phase change between a solid and a liquid state generally at a melting temperature;
    a piston connected with the chamber to extend and retract as the medium changes phase;
    an electric heating and cooling means for selectively adding heat energy to and removing heat energy from the medium;
    an electrically operated control means for controlling the heating and cooling means selectively to (i) hold the medium substantially at the melting temperature, (ii) add heat energy to extend the piston, and (iii) remove heat energy to retract the piston.

11. A remotely and electrically controlled actuator comprising:
    a chamber having a relatively flat surface and defining a plurality of thin paths along the flat surface, along the flat surface, the chamber and paths containing an expandable medium which expands and contracts with heating and cooling such that heat is rapidly introduced into and extracted from the expandable medium;
    an extensible member connected with the chamber for extending when the medium is heated and retracting when the medium is cooled;
    a Peltier effect chip means operatively mounted to the relatively flat surface for introducing heat to expand the medium and extend the member and for extracting heat to contract the medium and retract the member.

12. The actuator as set forth in claim 11 further including a temperature maintaining means for causing the Peltier effect chip means to heat the medium in response to the piston retracting beyond a preselected retracted position and a preselected extended position.

13. The actuator as set forth in claim 12 wherein the expandable medium is a wax which undergoes a solid to liquid phase change substantially at the set point temperature.

14. A method of selectively extending and retracting an element and a chamber combination in which the chamber contains a medium that undergoes a substantially isothermal phase change between a first or contracted state and a second, expanded state at a phase change temperature, the method comprising:
    maintaining the medium substantially at the phase change temperature;
    adding heat energy to the medium such that the medium changes from the first state to the second state expanding and causing the element and chamber combination to extend;
    removing heat energy from the medium such that the medium changes phase from the second phase to the first phase contacting and causing the element and chamber combination to retract.

15. The method as set forth in claim 14 wherein the medium is a wax which changes from between solid and liquid states.

16. A remotely controlled actuator comprising:
a chamber filled with a medium that expands as it undergoes a phase change from a solid phase to a liquid phase and contracts as it changes phase from a liquid phase to a solid phase;
a structure connected with the chamber for extending and retracting relative to the chamber as the medium expands and contracts;
a means for selectively heating and cooling the medium to cause the medium to change phase, extending and retracting the structure;
a temperature control means for controlling the heating and cooling means to maintain the medium substantially at a melting point temperature in which the medium undergoes the phase change.

17. The actuator as set forth in claim 16 wherein the temperature control means controls the heating and cooling means to add and remove thermal energy cyclically such that the structure cyclically extends and retracts and further including a means for changing the cyclic extension and retraction of the structure into rotary motion.

18. The actuator as set forth in claim 16 wherein the heating and cooling means includes a Peltier effect chip.

19. An electrically controlled actuator comprising:
a chamber which contains a medium which expands and contracts as it undergoes a substantially isothermal phase change between liquid and solid states generally at a melting temperature;
an element connected with the chamber to extend and retract as the medium changes phase;
an electrical heating and cooling means for selectively adding heat energy to and removing heat energy from the medium;
an electrically operated control means for controlling the heating and cooling means selectively to (i) hold the medium substantially at the melting point, (ii) add heat energy to extend the element, and (iii) remove heat energy to retract the element.

20. The actuator as set forth in claim 19 wherein the electric heating and cooling means includes a Peltier effect chip.

21. The actuator as set forth in claim 19 wherein the chamber is relatively thin in one dimension and a thermally conductive structure interconnects opposite surfaces in the thin dimension to define a multiplicity of thin paths that are filled with the medium, such that the thermally conductive structure both provides mechanical strength and conducts thermal energy into and out of the medium.

* * * * *